P. W. KNAUF.
VALVE OPERATING MECHANISM.
APPLICATION FILED AUG. 22, 1908.

956,772.

Patented May 3, 1910.
2 SHEETS—SHEET 1.

WITNESSES:

INVENTOR
Paul W Knauf
BY
John E. Hubbell
ATTORNEY.

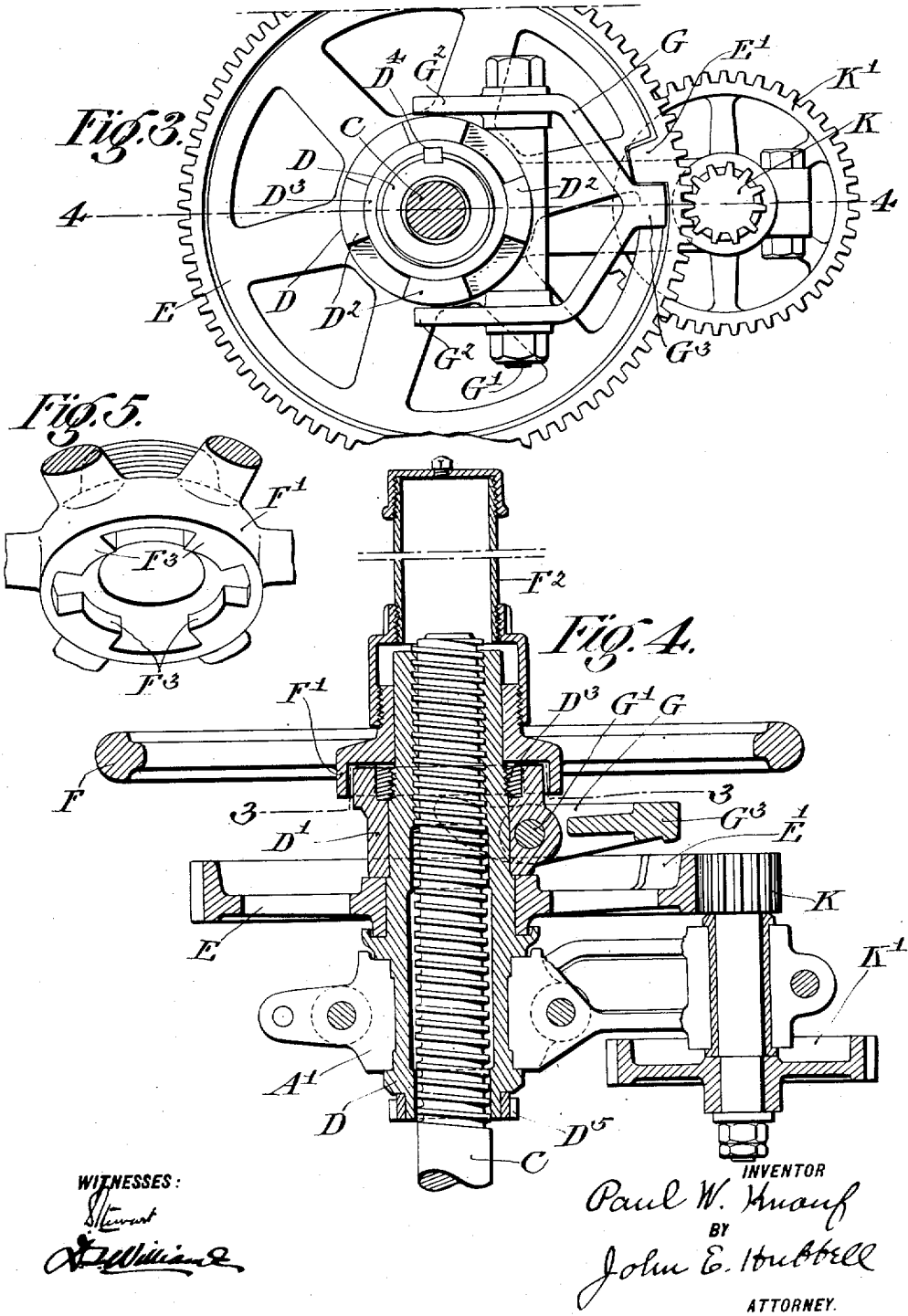

UNITED STATES PATENT OFFICE.

PAUL W. KNAUF, OF CYNWYD, PENNSYLVANIA, ASSIGNOR TO SCHUTTE AND KOERTING COMPANY, OF PHILADELPHIA, PENNSYLVANIA, A CORPORATION OF PENNSYLVANIA.

VALVE-OPERATING MECHANISM.

956,772.   Specification of Letters Patent.   Patented May 3, 1910.

Application filed August 22, 1908. Serial No. 449,785.

*To all whom it may concern:*

Be it known that I, PAUL W. KNAUF, a citizen of the United States of America, residing at Cynwyd, in the county of Montgomery, in the State of Pennsylvania, have invented a certain new and useful Improvement in Valve-Operating Mechanism, of which the following is a true and exact description, reference being had to the accompanying drawings, which form a part thereof.

The present invention relates to operating mechanisms for valves and particularly for valves of the kind which are operated by hand under some conditions and by a motor under other conditions.

The object of the invention is to provide a simple and effective valve operating mechanism so constructed and arranged that when the valve is operated by hand, the motor driving mechanism is disconnected, so that no part of such mechanism needs be rotated by hand, while when the motor driving mechanism is in operation, the manual driving device, which is usually in the form of a large hand wheel, is disengaged from the valve, thus eliminating the fly wheel motion of the hand wheel in starting or stopping the motor drive.

The various features of novelty which characterize my invention are pointed out with particularity in the claims annexed to and forming a part of this specification. For a better understanding of the invention, however, and the advantages possessed by it, reference may be had to the accompanying drawings and descriptive matter, in which I have illustrated and described one of the forms in which the invention may be embodied.

Figure 1:
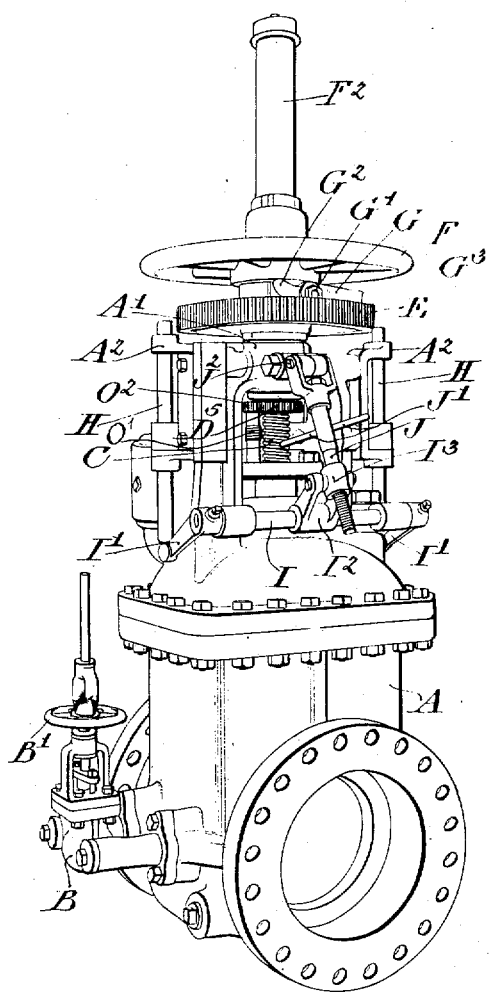
Figure 2:
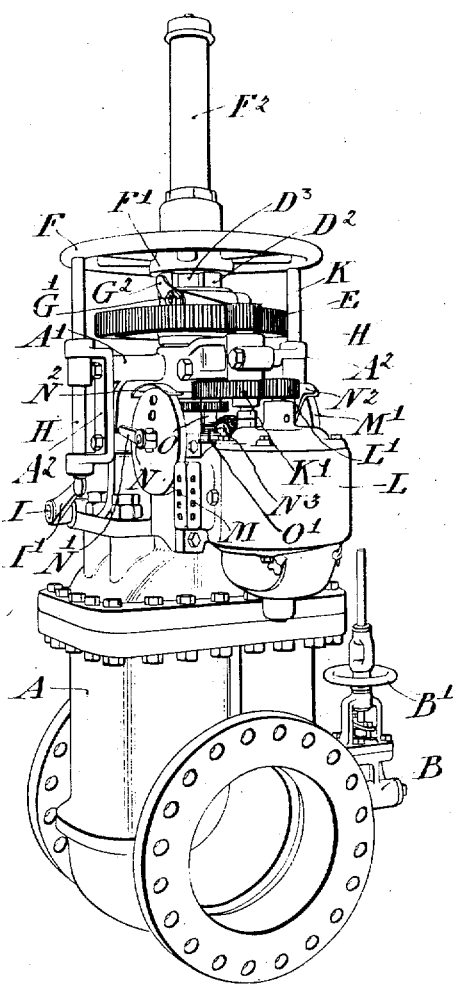

Of the drawing: Figure 1 is a perspective view of a valve equipped with my invention. Fig. 2 is a view similar to Fig. 1, but taken from a different point of view. Fig. 3 is a partial sectional plan of the valve taken on the line 3—3 of Fig. 4. Fig. 4 is a sectional elevation taken on the line 4—4 of Fig. 3, and Fig. 5 is a perspective view of a portion of the hand wheel.

In the drawings: A represents the casing of a gate valve of well known form.

B represents a small pilot valve operated by a hand wheel $B^1$ in the usual way, to balance the pressure on the opposite sides of the main valve at the time of opening the valve.

To the upper side of the valve casing A is secured a yoke $A^1$, in which is journaled an elongated nut D, which is rotated to move the threaded non-rotatable valve stem C up and down to open and close the main valve. The nut D is adapted to be rotated either by the hand wheel F or by the large gear wheel E accordingly, as the hand wheel or gear is clutch connected to the nut D. The upper end of stem C is inclosed and protected by a cap $F^2$ secured to hand wheel F.

A clutch collar $D^1$ is secured to the nut D by the clamping ring $D^3$ and the feather or key $D^4$. The clutch ring $D^1$ has formed on its upper end radial lugs $D^2$, which enter between lugs or shoulders $F^3$ on the under side of the hub $F^1$ of the hand wheel F, (see Fig. 5) when the latter is moved down from the position shown in Fig. 2 to the position shown in Figs. 1 and 4.

A bifurcated lever G is pivoted on a shaft $G^1$ carried by the clutch ring $D^1$. The ends $G^2$ of the bifurcated portions of the lever G are held by the overbalancing weight of the other end $G^3$ of the lever in engagement with the lower edge of the rim portion of the hand wheel hub. When the hand wheel is elevated as shown in Fig. 2 the end $G^3$ of the lever G drops down into position to engage a lug $E^1$ formed on the upper side of the gear wheel E. When, however, the hand wheel F is dropped down into the position in which it is engaged with the clutch ring $D^1$, the lever G is turned to carry its end $G^3$ above the path of the lug $E^1$. In consequence of this arrangement, it will be observed that when the hand wheel is down in the operative position, the gear wheel E is disconnected from the nut D, while when the hand wheel F is lifted up from the operative position, the gear wheel E is connected to the nut D.

The means for raising and lowering the hand wheel F comprises a pair of rods H parallel to the valve spindle and located on the opposite sides thereof. These rods H are mounted in perforated ears provided on brackets $A^2$ secured to the yoke $A^1$. The lower ends of the rods H rest on arms $I^1$ carried by rock shaft I, which is journaled in brackets carried by the yoke $A^1$. Midway between its ends, the shaft I is provided with a bifurcated arm $I^2$, to which is pivoted a nut $I^3$. An operating rod J provided with a cross piece or handle $J^1$ has its upper end swiveled in a yoke J² pivoted to the yoke A¹ and its lower end threaded through the nut I³. As the rod J is rotated in one direction or the other, the rock shaft I is turned so that the arms I¹ move the rods H upward or allow them to move downward. When the rods H are down, as shown in Fig. 1, the hand wheel F is in the position in which it is clutched to the nut D and the end G³ of the lever G is held out of the path of the lug E¹ of the gear wheel E. When, however, the rods H are elevated as shown in Fig. 2, the hand wheel F is disconnected from the nut D¹ and the elevation of the hand wheel F allows the end G³ of the lever G to drop down into the path of the lug E¹ on the gear wheel. The rods H then hold wheel F stationary.

The gear wheel E in the form shown is rotated by a small gear wheel K carried at the upper end of a shaft which has secured to its lower end a gear wheel K¹, which meshes with and is driven by a gear wheel L¹ carried by the shaft of an electric motor L.

A spur gear D⁵ is secured to the lower end of the nut D and meshes with a gear wheel O². The gear wheel O² is carried at the upper end of a small shaft O. The shaft O is provided with a worm O' which meshes with a gear N³ carried by a shaft N. The shaft N is provided at its ends with contact or switch arms N' adapted to close contacts N² carried by the contact carrying members M and M' when the valve moves into the wide open or fully closed positions in order to then stop the motor. The contact carrying members M and M' are supported by the stationary frame work or casing of the valve.

The construction illustrated and described has been found in practice to be highly satisfactory. The simple and effective clutch mechanism described prevents the hand wheel F from exerting any fly wheel action upon the valve operating member D when the latter is being turned by the electric motor. Similarly these connections insure that when the valve is being operated by hand, there is no extra load due to the gearing or any part of it by which the valve may be operated by the motor. The provision of only one lug E¹ on gear E allows the motor to get well started before starting to move the valve.

Having now described my invention, what I claim as new, and desire to secure by Letters Patent is,

1. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said member to the power actuated wheel in another axial position of the hand wheel, and means for moving said hand wheel axially.

2. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said member to the power actuated wheel in another axial position of the hand wheel, and means engaging the periphery of the hand wheel for moving and holding the latter out of the position in which it is clutched to said member.

3. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said member and the power actuated wheel in another axial position of the hand wheel, a rock shaft and connections operated thereby for engaging the periphery of the hand wheel to move and hold the latter out of the position in which it is clutched to said member.

4. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said member and power actuated wheel in another axial position of the hand wheel, a plurality of members free to move in a direction parallel to the axis of the hand wheel and arranged in line with the periphery of the hand wheel, and means for moving said members to cause them to engage the periphery of the hand wheel and move the latter axially.

5. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said wheel to the power actuated wheel in another axial position of the hand wheel, a plurality of members free to move in a direction parallel to the axis of the hand wheel and arranged in line with the periphery of the hand wheel, a rock shaft having arms which engage and move said members when the rock shaft is turned, and means for turning said rock shaft.

6. In combination, a valve, a rotatable valve actuating member, an axially movable and rotatable hand wheel, a rotatable power actuated wheel, clutch mechanism dependent upon the axial position of the hand wheel for connecting said member and hand wheel together in one axial position of the hand wheel and for connecting said member and power actuated wheel in another axial position of the hand wheel, a plurality of members free to move in a direction parallel to the axis of the hand wheel and arranged in line with the periphery of the hand wheel, a rock shaft having an operating arm and other arms which engage and move said members when the rock shaft is turned, and an extensible connection between said operating arm and the valve casing.

7. A valve operating mechanism comprising in combination a vertical and vertically movable but non-rotatable threaded valve spindle, a rotatable nut through which said spindle is threaded, a hand wheel and a power actuated wheel which surround said spindle and clutch mechanism by which said nut may be connected to one or the other of said wheels, said clutch mechanism comprising shoulders carried by the nut and the hand wheel adapted to engage and disengage when said hand wheel is moving axially, a lever pivoted to said nut and having one end engaging said hand wheel and a lug on said power actuated wheel adapted to engage the other end of said lever when the latter is in the position corresponding to the position of the hand wheel in which the latter is disengaged from the nut.

PAUL W. KNAUF.

Witnesses:
ARNOLD KATZ,
D. STEWART.